Sept. 28, 1954 W. S. W. EDGAR, JR 2,690,474

TIME AND DATE TRANSMITTER

Filed May 19, 1949 6 Sheets-Sheet 1

INVENTOR.
W. S. W. EDGAR JR.

BY M. J. Reynolds
ATTORNEY

Sept. 28, 1954 W. S. W. EDGAR, JR 2,690,474

TIME AND DATE TRANSMITTER

Filed May 19, 1949 6 Sheets-Sheet 2

INVENTOR.
W. S. W. EDGAR JR.

BY M. J. Reynolds

ATTORNEY

Sept. 28, 1954 W. S. W. EDGAR, JR 2,690,474

TIME AND DATE TRANSMITTER

Filed May 19, 1949 6 Sheets-Sheet 3

*INVENTOR.*
W. S. W. EDGAR JR.

*BY* M J Reynolds

ATTORNEY

Sept. 28, 1954 W. S. W. EDGAR, JR 2,690,474

TIME AND DATE TRANSMITTER

Filed May 19, 1949 6 Sheets-Sheet 4

INVENTOR.
W. S. W. EDGAR JR.

BY M. J. Reynolds

ATTORNEY

TIME AND DATE TRANSMITTER

Filed May 19, 1949 6 Sheets-Sheet 5

INVENTOR.
W. S. W. EDGAR JR.

BY M. J. Reynolds

ATTORNEY

Sept. 28, 1954 W. S. W. EDGAR, JR 2,690,474

TIME AND DATE TRANSMITTER

Filed May 19, 1949 6 Sheets-Sheet 6

INVENTOR.
W. S. W. EDGAR JR.

BY

ATTORNEY

Patented Sept. 28, 1954 2,690,474

UNITED STATES PATENT OFFICE 2,690,474

TIME AND DATE TRANSMITTER

William Stanley Westerman Edgar, Jr., New York, N. Y., assignor to The Western Union Telegraph Company, New York, N. Y., a corporation of New York Application May 19, 1949, Serial No. 94,214

4 Claims. (Cl. 178—17.5)

This invention relates to telegraph transmitters and more particularly to a transmitter for automatically sending to a line circuit or to a plurality of line circuits predetermined and variable information in the form of code telegraph signals.

The invention will be described with reference to the automatic storage and transmission of a sequence of code signals representing the time of day in hours and minutes and the date in days, months and years, although it is to be understood that it is not limited to such information.

It has been the established practice in manual transmission of telegraph messages over certain patrons' tie line circuits to include in the transmission the time of day in hours and minutes so that the received message indicates on its face the time of reception in the patron's office. In modern reperforator switching systems, however, the incoming messages at a switching center are received on perforated tape or other signal storage means and retransmitted therefrom to the outgoing circuit either by a manual or an automatic switching operation. In such cases it is impractical for an operator to manually transmit the time and date information at the end of each message.

An object of the present invention is, therefore, to provide means for automatically transmitting time and date information following the transmission of each message over predetermined outgoing circuits.

Another object is to provide means for automatically setting up variable information on storage means, as periodic changes occur therein.

Still another object is to provide means controlled by the message being transmitted over a line for effecting transmission of information over said line, supplemental to the message.

Another object is to provide means whereby variable information may be stored and automatically transmitted simultaneously over a plurality of line circuits.

Another object is to provide a plurality of code telegraph signal storage devices in which variable information may be stored and from which such information may be transmitted in sequential relation.

Still another object is to provide means for storing signals representative of current time and for transmitting such signals over one or more line circuits.

A further object is to provide such a means in which the storage operations and the transmitting operations will be effected in different time intervals.

Other objects and advantages will hereinafter appear.

In accordance with the present invention I provide a plurality of settable devices upon which the variable information to be automatically transmitted is stored in the form of telegraph code signals. In the embodiment shown this information comprises the time of day in hours and minutes, the day of the month, the month and year, together with certain arbitrary and case shift signals. Typical time and date messages would appear in the following printed form:

(1250 PM AUG 22 48) =
(110 AM AUG 2 48) =

The first of these messages in signal form would include the following 24 signal combinations: (1) figures shift, (2) parentheses, (3, 4, 5, 6) numerals "1250," (7) word space, (8) letter shift, (9, 10) letters "PM," (11) word space, (12, 13, 14) letters "AUG," (15) word space, (16) figures shift, (17, 18) numerals "22," (19) word space, (20, 21) numerals "48," (22) parenthesis, (23) letters shift, and (24) equals sign. Of these signals, Nos. 1, 2, 7, 8, 10, 11, 15, 16, 19, 22, 23 and 24 are invariable and are permanently set upon the storage medium. The intervening character signals are variable and modified as required by the changing time and date. The time of the day signals are changed each minute by minute pulses from any suitable source, as from time signals supplied in the standard Western Union Telegraph Company time system or from contacts on an electrically driven clock. These same signals serve to change the meridian setting to indicate AM or PM. At the end of each month, irrespective of the number of days, these time signals act through the storage devices to operate an alarm or indicator to indicate to an attendant the necessity of changing the "month" abbreviation storage, which is effected by means of a manual switch. The "year" is also set manually at the end of each year.

In addition to the time and date storage mechanism the invention includes a collator for assembling the data currently set up on the various time and date storage devices and an associated distributor for operating the collator and applying the signals to the line transmitting apparatus.

The control of the distributor is accomplished by means responsive to a call for the time and date transmission initiated by the usual double period end-of-message signal from the tape transmitter through the cord circuit arrangement. If, at the time a call is placed for time and date transmission over any circuit, transmission is proceeding over another circuit or circuits, or if the time and date storage mechanism is in the course of operation in response to a minute impulse, the transmission over the calling circuit will be delayed until either or both operations have been completed. On the other hand, should a time pulse be received during a transmitting operation, the setting up of the new time on the time storage mechanism will be delayed until the transmission is completed.

The invention will be best understood by reference to the accompanying drawings, in which.

Figure 3:
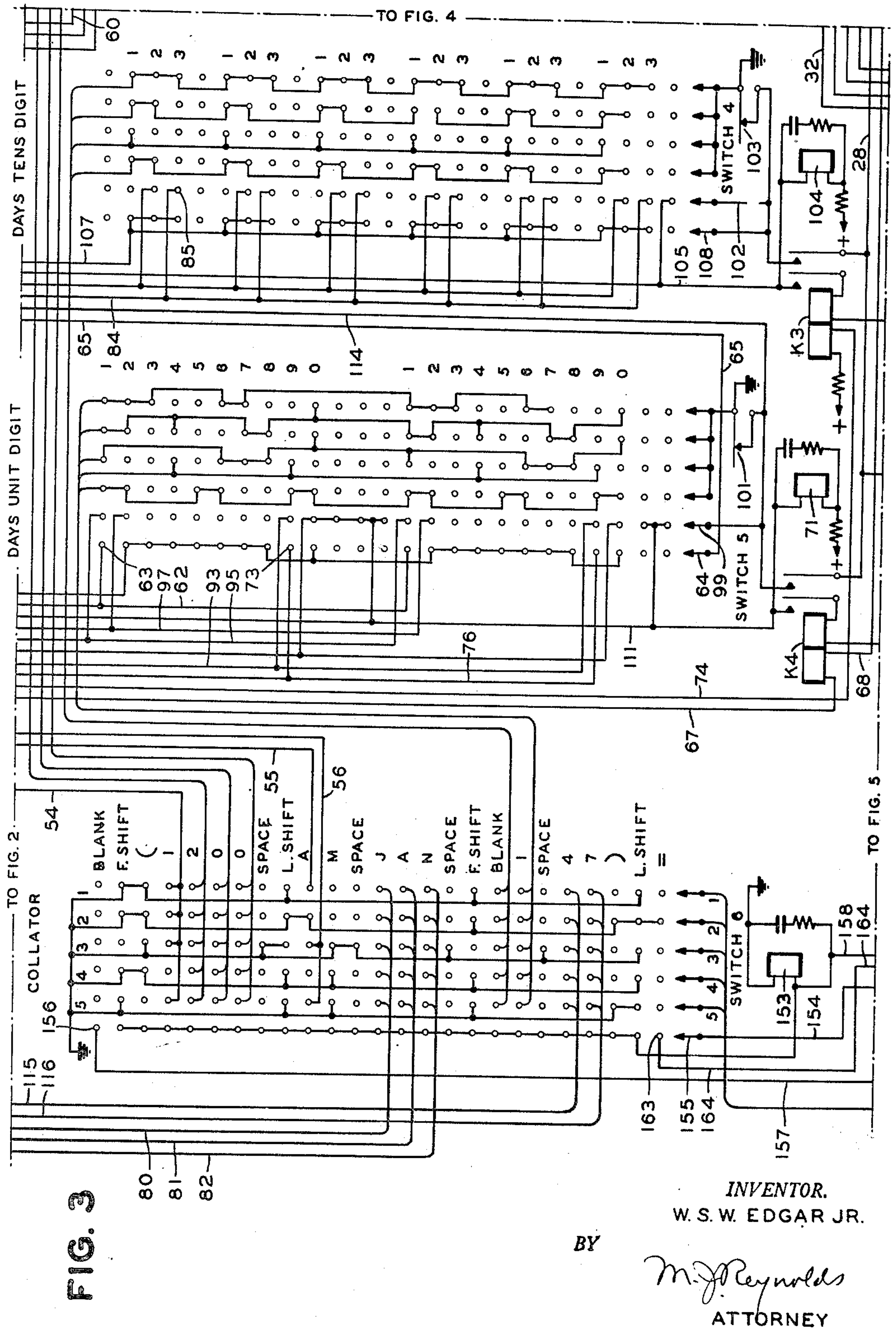
Fig. 3 is a schematic view of the day unit digit and tens digit storage switches and the transmitting collator or switch.
Figure 4:
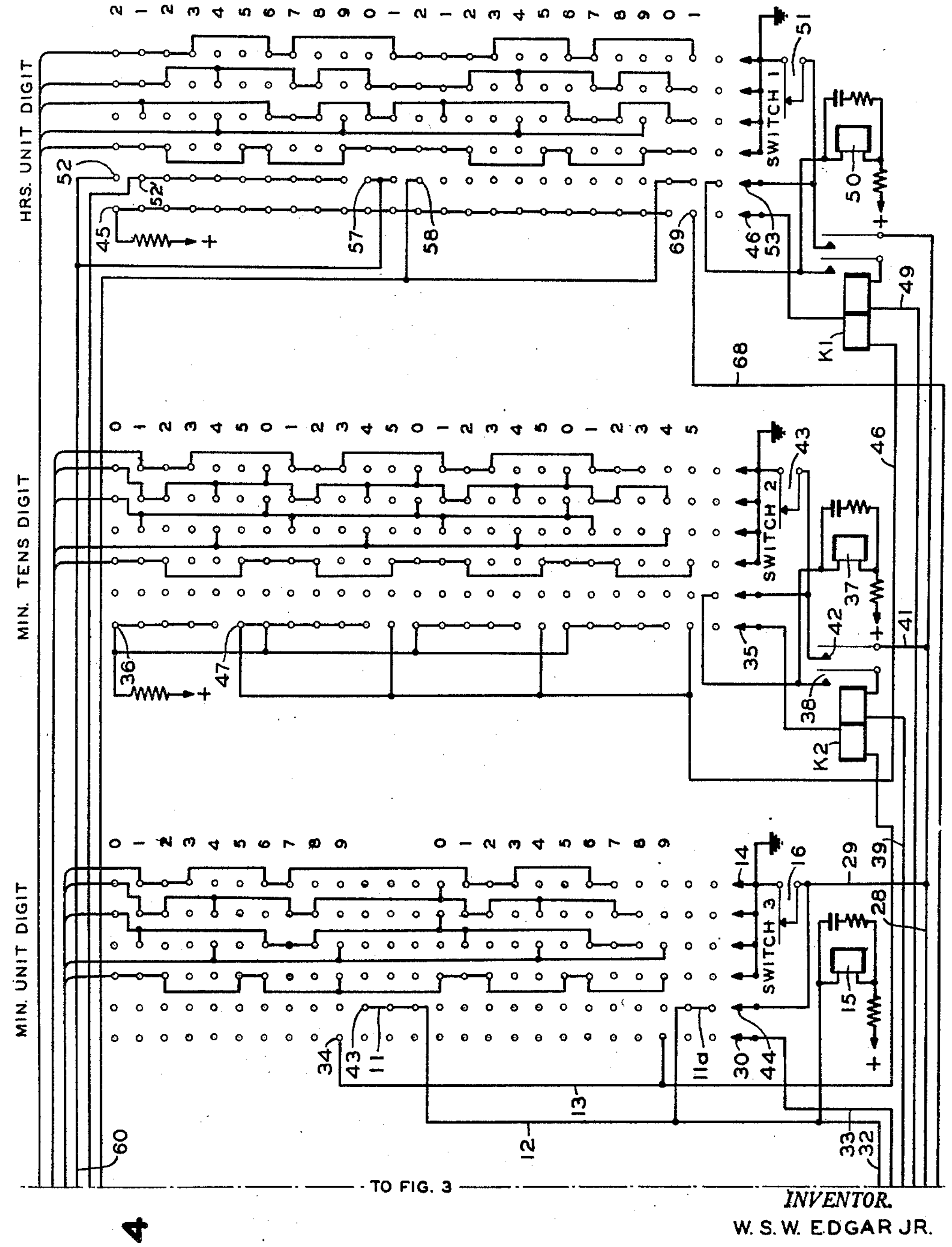
Fig. 4 is a schematic view of the hours unit digit, the minute tens digit and the minute units digit storage switches.

Referring first to Figs. 3 and 4, six 25 point rotary switches indicated as switch 1 to switch 6 are shown, each having six levels. Switch 1 provides for the storage of the hours unit digits; switch 2, the minute tens digits; switch 3, the minute units digits; switch 4, the days tens digits; and switch 5, the days units digits. Switch 6 comprises the collator to which the current settings of switches 1 to 5 are applied, together with the remaining characters of the time and date message. Of these additional characters the meridian signals, that is, the A and P characters of AM and PM, are set upon the collator switch by a relay 7 (see Fig. 2); the hours tens digits by a relay 8, the month abbreviation signals by a manual multi-position switch 9, and the year signals by the strappings on a year block 10. For convenience it will be assumed that the current time message set upon the various storage devices is as follows:

(1200 AM JAN 1 47)=

In this case the characters and symbols set upon the first five (right hand) studs of the collator switch 6 and their origin will be as follows:

| Position | Signal | Origin |
|---|---|---|
| 1 | Blank | 1st row of switch 6. |
| 2 | Figs. shift | 2nd row of switch 6. |
| 3 | Parenthesis—( | 3rd row of switch 6. |
| 4 | Hours tens digit—1 | Make contact of relay 8. |
| 5 | Hours units digit—2 | 1st row of switch 1. |
| 6 | Min. tens digit—0 | 1st row of switch 2. |
| 7 | Min. units digit—0 | 1st row of switch 3. |
| 8 | Word space | 8th row of switch 6. |
| 9 | Letters shift | 9th row of switch 6. |
| 10 | Meridian—A | Make contact of relay 7. |
| 11 | Meridian—M | 11th row of switch 6. |
| 12 | Word space | 12th row of switch 6. |
| 13, 14, 15 | Abbrev. JAN | 1st row of switch 9. |
| 16 | Word space | 16th row of switch 6. |
| 17 | Figs. shift | 17th row of switch 6. |
| 18 | Blank | 1st row of switch 4. |
| 19 | Day—1 | 1st row of switch 5. |
| 20 | Word space | 20th row of switch 6. |
| 21, 22 | Year—47 | Year Block 10. |
| 23 | Parenthesis—) | 23rd row of switch 6. |
| 24 | Letters shift | 24th row of switch 6. |
| 25 | Equals sign—= | 25th row of switch 6. |

Referring now to Fig. 4, the minute units digit storage switch 3 is shown with the studs thereof strapped as indicated in the drawing. The first four (right hand) levels are coded to represent in permutation code the digits 0 to 9 in two series, as indicated at the right of the switch. Since this consumes but 20 of the 25 points, the remaining five points in the fifth level are strapped in two series 11 and 11a by a conductor 12 in a manner, as will subsequently appear, to cause the switch to step automatically from the No. 9 digit position to the next No. 0 digit position. Studs of the sixth level and No. 9 digit position are connected to a conductor 13 terminating in one winding of a control relay K2 associated with the minutes ten digit storage switch, the purpose of which will appear.

A series of six wipers 14 are advanced across the switch contacts by a stepping magnet 15 as is well known in the art. Interrupter contacts 16 are arranged to be opened upon each operation of the stepping magnet 15. The operation of the stepping magnet 15 is controlled by two relays D and E (Fig. 5), each of which has an operating and a locking winding. The operating winding of relay D is connected to a source of minute pulses 17 so as to be operated once each minute.

Figure 5:
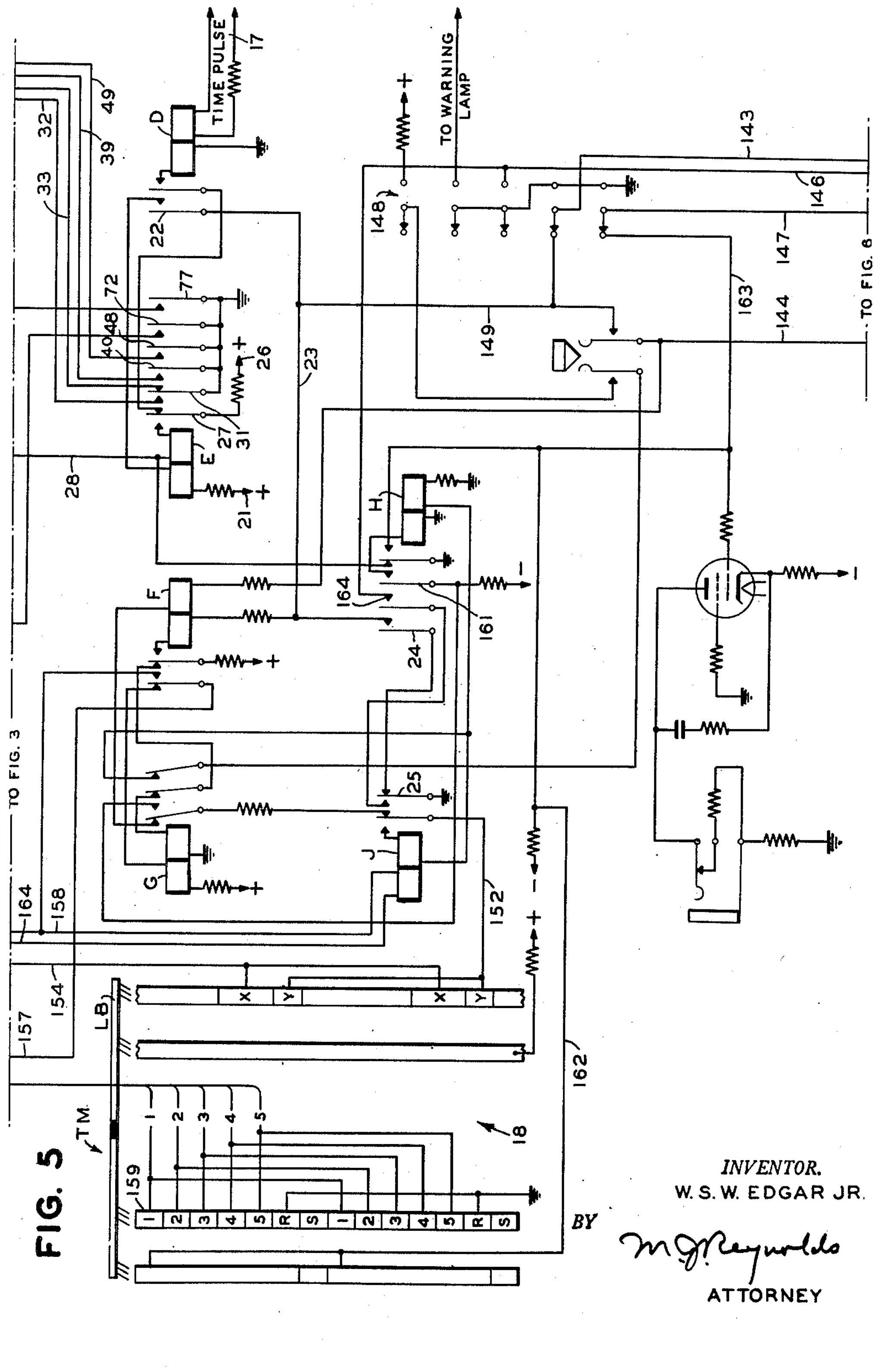
Fig. 5 is a schematic view of time pulse receiving relays and the transmitting distributor and associated relay circuits.

Four control relays F, G, H, and J are associated with the time and date transmitting distributor 18 of Fig. 5 and the collator or distributing switch 19 of Fig. 3 in such manner as to be controlled, in part, thereby. The operation of these relays will be described in detail hereinafter, but for the moment it is sufficient to state that relay H is in unoperated condition whenever transmission of a time and date message is in progress and remains operated only when no such transmission is occurring. One purpose of relay H is to control the time of application of the received time pulses over conductors 17 to the time and date storage mechanism so that the time setting will be changed only during idle transmission periods.

Referring again to relay D, and assuming it has just operated in response to a time impulse, and that relay H is operated (i. e., no time message is being transmitted), relay D then completes a circuit for relay E from battery 21, left winding of relay E, left armature and make contact 22 of relay D, conductor 23, outer armature and make contact 24 of relay H, and outer armature 25 and break contact of relay J (also unoperated in the idle condition of the time and date transmitter) to ground. Relay E locks up from battery 26, through armature 27 and make contact of relay E, its operating winding, and thence over conductors 28, 29 and interrupter contacts 16 of storage switch 3 to ground.

If it be assumed that the time and date set up on the switches 1 to 6, relays 7 and 8, switch 9 and year block 19 is in accordance with the example heretofore given, namely, (1200 AM JAN 1 47)=, then the wipers 14 of the minute units digit switch 3 will be on the zero digit or top row of studs. When the minute impulse is received to actuate relay E, as just described, this relay completes a circuit from ground on its armature 31, make contact and conductor 32, to the stepping magnet 15 of switch 3 and thence to battery. Magnet 15 operates and in so doing opens the interrupter contacts 16, thus unlocking relay E which releases, breaking the circuit to magnet 15. The wipers 14 advance on the back stroke of the magnet, onto the number 1 digit studs of the switch, which are coded to set up on the collator switch 6 the last digit of the new time "1201."

If relay H had not been operated, at the instant the minute pulse was received, due to a busy condition of the time and date transmitter, the circuit to the operating winding of relay E would have been open at armature 24 of relay H, and relay E would not have operated. In this event relay D would have locked up through armature 27 and back contact of relay E, and the operation of relay E would have been delayed until relay H became operated, which occurs as soon as the transmission is completed and collator switch 6 returns to the idle position. Since the operating cycle of switch 6 is only about four seconds, the maximum delay in the stepping of the time switch 3 in response to a minute pulse is of this order of magnitude.

As each minute pulse is received, switch 3 is advanced until it reaches its first digit (9) position to set up the time 1209 on switch 6. At this instant as relay E releases a circuit is completed from ground at armature 31 of relay E, its back contact, conductor 33, sixth level wiper 30 of switch 3, sixth level contact 34, conductor 13, winding of relay K2 of the tens minute digit switch 2, sixth level wiper 35 of this switch and sixth level stud 36 of the first zero digit position of switch 2 (upon which the wiper 35 stands at time 1209) to battery. Relay K2 operates and prepares a circuit for the operating magnet 37 of switch 2 through its operated contacts 38, its locking winding and by way of conductor 39 to the make contact of armature 40 of relay E.

Upon the next operation of relay E in response to a minute pulse this relay locks up over conductors 28 and 29 and interrupter contact 16 of switch 3 to ground and also in parallel thereto over conductor 41, outer contact 42 of relay K2 and interrupter contact 43 of switch 2, to ground. At the same time the operating circuit for magnets 15 and 37 of switches 3 and 2, respectively, are completed at armatures 31 and 40 of relay E to advance the wipers of the switches to the next lower row. In the case of switch 2 this movement leaves the wiper on the digit (1) position. In the case of switch 3, however, the next three rows, following the digit 9, are not coded and it is necessary to step the wiper automatically over these rows and onto the second zero digit position so as to set up the time 1210 on the collator switch 6. This is accomplished by the strapping 11 whereby a circuit is completed from battery through the operating magnet 15, conductor 12, fifth level stud 43, wiper 44 and interrupter switch 16 to ground. This circuit is opened by contacts 16 upon each operation of magnet 15 causing the wipers to step across the strapped fifth level contacts and onto the second zero digit row.

The operation of switch 3 then continues as each minute impulse is received until the second digit (9) is reached, or time 1219, whereupon relay K2 is again operated as described so that the next minute pulse advances both switches 3 and 2 to set up the code 1220 on collator switch 6, switch 3 automatically stepping over the last two idle rows onto the top or zero digit position again. When switches 3 and 2 have advanced to the 59th minute position, relay K2 is again operated from one of the digit (9) positions of switch 3 and relay K1, associated with the hours units digit switch 1, is operated in series therewith from the first digit (5) position of switch 2. This circuit may be traced from battery at the top sixth level stud 45 of switch 1, wiper 46 (resting on the first digit (2) position of switch 1 at time 1259), left winding of relay K1, conductor 46, sixth level stud 47 of switch 2 (digit (5) position), wiper 35, winding of relay K2, conductor 13, stud 34 of switch 3, wiper 30, and thence by conductor 33 to the back contact and armature 31 of relay E. Upon operation of relay E, relay K2 locks up as heretofore described through armature 40 of relay E and relay K1 locks up over a similar circuit including armature 48 of relay E, conductor 49, right winding of relay K1, its inner armature and stepping magnet 50 of switch 1.

Relay E also locks up by parallel circuits to ground through the interrupter contacts 16, 43 and 51 of switches 3, 2 and 1, respectively.

Consequently this operation of relay E, in response to a minute pulse, steps each of the switches 1, 2 and 3, thereby setting up the three digits (1), (0) and (0), respectively, on collator switch 6.

Prior to the stepping of switch 1 from its topmost row of contacts a circuit was completed for the hours tens digit relay 8 and the meridian relay 7 from battery through the left winding of relay 8, the left winding of relay 7, conductor 60, fifth level stud 52 of switch 1, wiper 53 and interrupter contacts 51 to ground. Relay 8 in the operated condition applies ground to conductor 54 to apply the digit (1) code to the 4th row of contacts of the collator switch 6. In its released position a blank or all spacing code is applied to these contacts by the removal of the ground connection at the armature of relay 8. Relay 7 when so operated applies ground to conductor 55 to apply the code meridian signal (A) to the contacts of the 10th row of switch 6 and when released applies ground to conductor 56 to apply the meridian signal (P) to these contacts.

As switch 1 steps off the 1st row of studs, the operating circuit of relays 8 and 7 is interrupted at stud 52. Relay 8 releases to set up a blank hour tens signal digit on switch 6 so that the time now appearing on these contacts is 100 or one o'clock. Relay 7 reenergizes, however, from battery through its right winding and the fifth level studs 52', wiper 53 and break contact 51. As the wiper of this switch moves once each hour over digit positions 1 through 9, that is, up through time changes including 959, the meridian signal (a) remains on the contacts of the 10th row of switch 6. As switch 1 leaves the 1st digit (9) position and contacts the zero digit position relays 8 and 7 are both again energized from stud 57, conductor 60, and the left windings of these relays so that the hour tens digit (1) again appears on the contacts of the 4th row of switch 6 to thus show the time as 1000 AM. This condition continues as the hour tens digit changes to (1) representing 1100 AM. As the next hour tens digit (2) is reached by the wipers of switch 1, relay 7 becomes deenergized by movement of the wiper 53 off of strapped studs 57 changing (AM) to (PM) on switch 6, but relay 8 is energized from stud 58 and the right winding of relay 8 to maintain the hour tens digit (1) on the collator switch 6 so that noon appears as 1200 PM.

Switches 3, 2 and 1 continue to step at minute, ten minute and hourly intervals, respectively, until the hours unit switch 1 reaches its next to last row of studs, at which time the hours tens digit relay 8 is operated and the minute switches stand at 59 representing a time of 1159 PM at which time a circuit is completed for control relay K4 of switch 5 from battery at the manual reset date switch 59 (Fig. 2) over contacts 61, conductor 62, stud 63 of the sixth level, row 1 of switch 5, wiper 64, conductor 65, contact 66 of reset date switch 59, conductor 67, winding of relay K4 of switch 5, conductor 68, stud 69 of the sixth level and next to last row of switch 1, wiper 46, relay K1 and thence by previously traced circuits in series through relays K2 to ground at armature 31 and back contact of relay E. Relay K4 prepares a circuit for the stepping magnet 71 of switch 5 through the right winding of relay K4 to armature 72 of relay E. Consequently, with relays K1, K2 and K4 energized, the next operation of relay E steps each of the switches 1, 2, 3 and 5 to set up the new time and day. Switch 1 idles past its last row of studs and rests again on its top row of contacts, thus operating meridian relay 7 again from stud 52 so as to change the meridian code from (P) to (A) on the collator switch 6. The day of month units digit switch 4 thus being stepped on to the second row or digit (2) position, the new time and date set up on switch 6 will be (1200 AM JAN 2 47) =.

This sequence of operation continues with switch 5 stepping once each 24 hours until its wipers rest on the first digit (9) position. This will occur at 1200 AM JAN 9. At this time a circuit is prepared for relay K3 associated with the days tens digit switch 4 from the sixth level stud 73, this circuit extending from battery through the left winding of relay K3, conductor 74, reset date switch contact 75, conductor 76, stud 73, wiper 64, conductor 65, reset date switch contact 66, conductor 67, left winding of relay K4, and conductor 68 to the sixth level stud 69 of switch 1. The circuit is open at this stud since the wiper of switch 1 is at this time upon its uppermost row of contacts. When switches 1, 2 and 3 and relay 7 have again cycled to time 1159 PM, switch 1 will be on its next to last row with wiper 46 engaging stud 69. The previously traced circuit will then be completed from stud 69 over wiper 46 and through relays K1, K2, and K3 in series to the back contact and armature 31 of relay E to ground, as heretofore explained. With relays K1 to K4 thus energized circuits are prepared to the stepping magnets of switches 1 to 5 from the front contacts of armatures 31, 40 48, 72 and 77 of relay E and upon the next operation of relay E each stepping magnet is energized, relay E locking up through parallel circuits to ground through contacts of each relay K1 to K4 and the interrupter switches of each of the stepping switches. As each stepping magnet operates it interrupts one of the parallel paths of this locking circuit until, when all stepping magnets are energized, relay E releases and each switch steps on the back stroke of the magnets. Switches 1, 2 and 3 and hour tens digit relay 8 are thus operated to set up the time 1200. Meridian relay 7 operates to set up the first character of the meridian signal AM. Switch 4 moves from its first or blank row to set the days tens digit (1) on switch 6 and switch 5 steps from its digit (9) position to the zero digit position, setting up the day 10, the composite time and date message on switch 6 now being (1200 AM JAN 10 47) =.

Figures 1, 2:
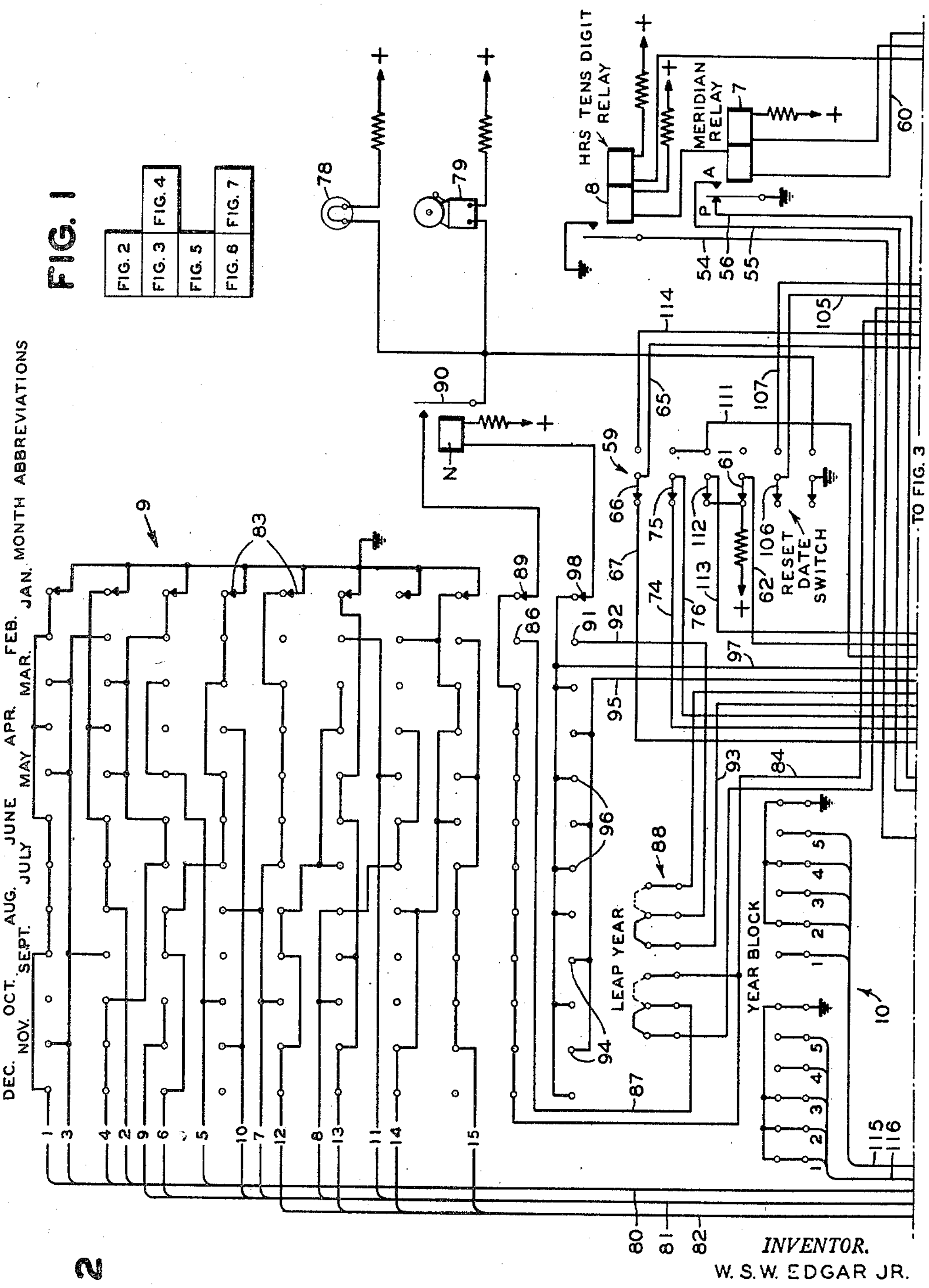
Fig. 1 shows the arrangement of the various sheets of drawings to form a composite circuit diagram of a preferred embodiment of the invention.
Fig. 2 is a schematic view of the month, year, meridian and hours tens digit storage mechanism.

Switch 4 steps in this manner each ten days until the end of each month at which time a signal is operated, shown as a lamp 78 and a bell 79 in Fig. 2. This occurs one minute after 1200 AM (midnight) of the last day of each month irrespective of the number of days in the month. For this purpose the manual month switch 9 is shown with twelve vertical rows of ten contacts each. Each row represents one month of the year. The first eight contacts of each row, from the top, are strapped together in coded manner and wired to the studs of the 13th, 14th and 15th row of studs of switch 6, by cabled conductors 80, 81 and 82 in such manner as to set up the month abbreviations JAN, FEB, etc. on switch 6, depending upon the position of the grounded wipers 83 of switch 9. The 9th and 10th rows of contacts of the month switch 9 control the operation of the signals 78 and 79 in accordance with the number of days in each month. For this purpose all of the contacts of the ninth row, except in the (FEB) position, are strapped together and connected by conductor 84 to all fifth level studs 85 of switch 4 in the digit (3) position, and serve to prepare a circuit to the make contact of relay N for all months having 30 or more days. The ninth row contact 86 in the (FEB) position of switch 9 is connected by conductor 87 through the strapping of a leap year block to the fifth level studs in the digit (2) position of switch 4 to prepare the above circuit to the contact of relay N for the month of February. The ninth row wiper 89 of switch 9 is connected through the make contact and armature 90 of a relay N to the signals 78 and 79 and thence to battery.

The 10th row of contacts of switch 9 are strapped in three groups representing 28, 30 and 31 day months. The 28 day or February contact 91 is connected by conductor 92 through the strapping of the leap year block, arranged as shown for a 28 day month, and thence by conductor 93 to the fifth level contacts in the digit (9) positions of switch 5.

The 30 day or APR, JUN, SEP AND NOV contacts 94 of the 10th row of switch 9 are connected together and by conductor 95 to the fifth level studs of switch 5 in each digit (1) position.

The 31 day or remaining contacts 96 of the 10th row of switch 9 are connected together and by conductor 97 to the fifth level studs of switch 5 in each digit (2) position.

In the case of the 31 day month January, the signals 78, 79 will be operated as switches 4 and 5 step from day 31 to day 32 or at midnight of January 31. These switches move at this time to a digit (3) position for switch 4 and a digit (2) position for switch 5. With switches 4 and 5 so positioned, a circuit for relay N may be traced from battery through the relay winding, tenth row wiper 98 of month switch 9, January stud 96, conductor 97, fifth level studs of day units digit switch 5 in the digit (2) position, wiper 99, and interrupter contacts 101 of switch 5 to ground. Relay N operates and completes a circuit for the signals 78, 79 from battery in parallel through the two signal devices, thence by wiper 89 of switch 9, January stud and conductor 84 to the fifth level studs of the day tens digit switch 4 in the digit (3) position, wiper 102 and interrupter switch 103 to ground. The operator in response to the signal manually moves the switch 9 to the February position.

Similar circuits may be traced from the February position of switch 9 through the hours tens and units digit switches 4 and 5 in their digit (2) and digit (9) positions, respectively, and from the 30 day month positions with switches 4 and 5 in their digit (3) and digit (1) positions, respectively.

The leap year block 88 is provided so that it may be manually strapped, as indicated in dotted lines, to operate the signals 78, 79 in the (FEB) position of month switch 9 and switches 4 and 5 in their digit (3) and zero digit positions, respectively, that is at midnight FEB 29.

At the beginning of each month it is also necessary to manually restore the switches 4 and 5 to their blank and digit (1) positions, respectively, to represent the first day of the new month. The date reset switch 59 upon being thrown momentarily to the right by the attendant, in response to the operation of signals 78 and 79, effects this result. In its right hand position switch 59 at its lower contact applies ground to the signals 78, 79 to continue their operation, thus to remind the attendant that switch 59 should not be left in that position. A stepping circuit is also completed for switch 4 to advance its wipers to the next digit (1) position, this circuit being completed from battery through stepping magnet 104 of switch 4, conductor 105, switch arm 106 of reset date switch 59, its right hand contact, conductor 107, sixth level studs in digit positions (1), (2) or (3), wiper 108 and interrupter contacts 103 to ground. Switch 4 thereby steps until its wipers engage the next blank position.

Switch 5 is restored to a digit (1) position by a similar circuit from battery through its stepping magnet 71, conductor 111, right contact and switch arm 112, thence by conductor 113 to the sixth level studs of switch 5 in the digit (2) to digit (8) and zero positions and by wiper 64 and conductor 65 to switch arm 66 and its right contact, thence by conductor 114 and interrupter contacts 101 to ground, thus advancing switch 5 from any digit (2) to digit (8) and zero digit position to digit (1) position. Advancement from the digit (9) position is effected by a parallel path in the above circuit from conductor 111 to wiper 64 and including switch arm 75 of the reset date switch 59, conductor 76, and sixth level stud of switch 5 in the digit (9) position thereof to wiper 64. Advancement over the blank rows of studs of switch 5 is accomplished from battery through the stepping magnet 71, conductor 111 to the fifth level studs in the blank row position of switch 5, to wiper 99 and interrupter contact 101 to ground. Thus switch 5 automatically steps from all positions excepting the digit (1) position, upon which it comes to rest. The reset date switch is then thrown back to the left, interrupting the signal circuit and restoring the normal control circuits of switches 4 and 5.

At the end of each year, in response to the signals 78, 79, it is necessary not only to shift the month switch 9 to its (JAN) position and to operate the reset date switch 59, as just described, but in addition to change the strapping on the year block 10 to set up the next year code combination thereon. This block is connected by cabled conductors 115, 116 to the 21st and 22nd positions of collator switch 6 to set the year tens and units digits codes thereon.

With the time and date correctly set upon collator switch 6 at all times, it may be transmitted over an outgoing circuit as a time and date message whenever desired. As stated, this is preferably accomplished automatically at the end of each message, being transmitted from a tape transmitter, under the control of an end-of-message signal, which conveniently may consist of two successive periods.

Figure 7:
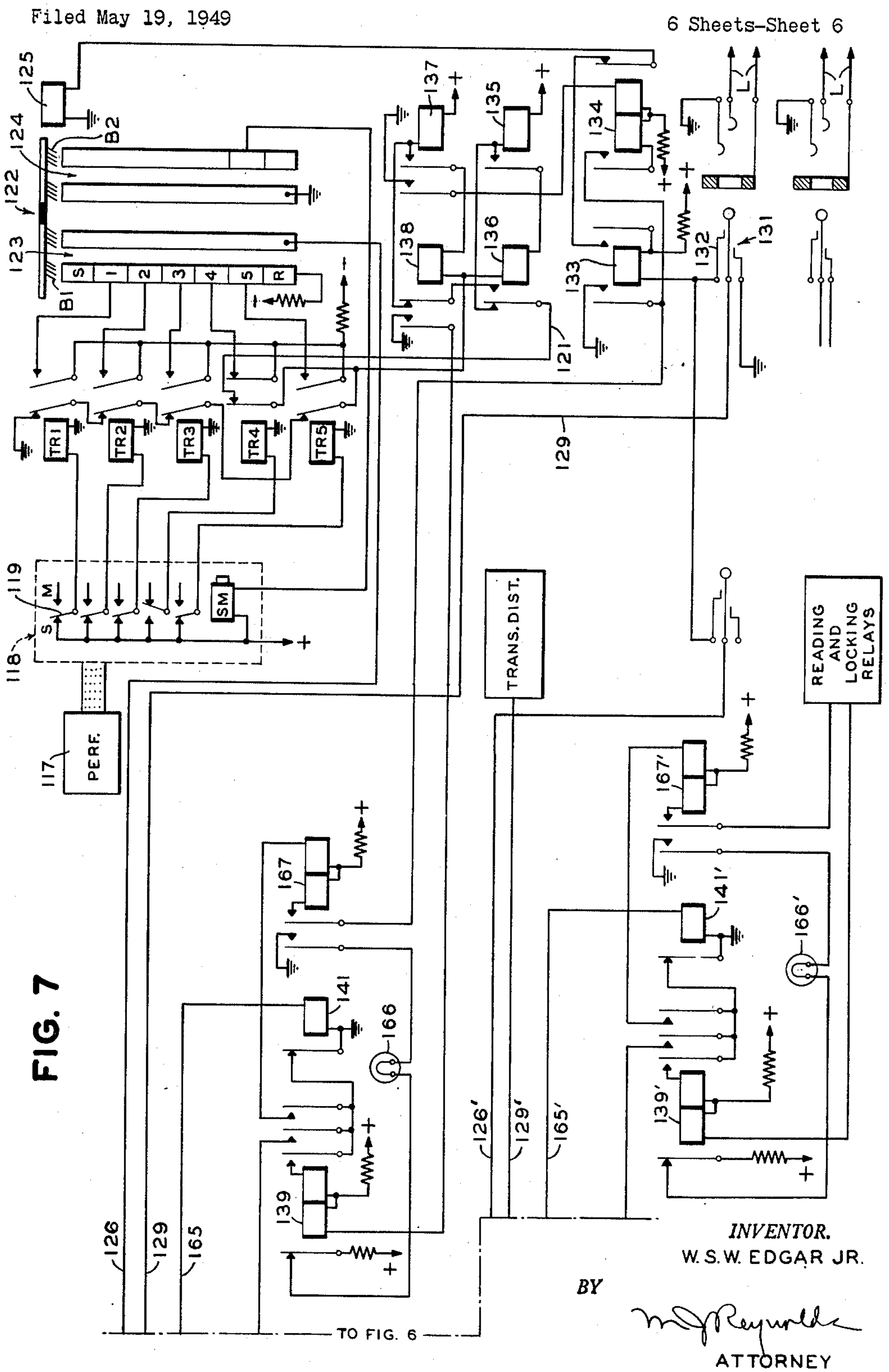
Fig. 7 is a schematic view of the tape transmitter cord circuit.

Referring now to Fig. 7, there is shown a receiving perforator 117 upon which signals from any desired source may be received and recorded in perforated tape form, to actuate a tape transmitter 118, such as that shown in the patent to Benjamin No. 1,298,440, and comprising a series of five contact arms 119 adapted to be operated between marking and spacing contacts M and S and a stepping magnet SM. In the embodiment shown battery is applied to the spacing bus bar. The contact arms are connected through the windings of five transmitting and reading relays TR1 to TR5 to ground. Relays TR1 to TR5 have two sets of armatures, the inner set being coded to complete a baffle circuit from ground at the make contact of relay TR1 to a conductor 121 for reading the period (4th pulse marking) code combination, as will later be explained, and the outer set of contacts is arranged to apply battery through back contacts, in response to marking signals, to the transmitting segments of a start-stop distributor 122 having transmitting rings 123, local rings 124 and associated brushes B1 and B2. The brushes B1 and B2 are held at rest on the rest segment R in the deenergized condition of start magnet 125. The local segment of ring 124 applies ground to the stepping magnet SM of the tape transmitter as the brush B1 engages the rest segment R.

Figure 6:
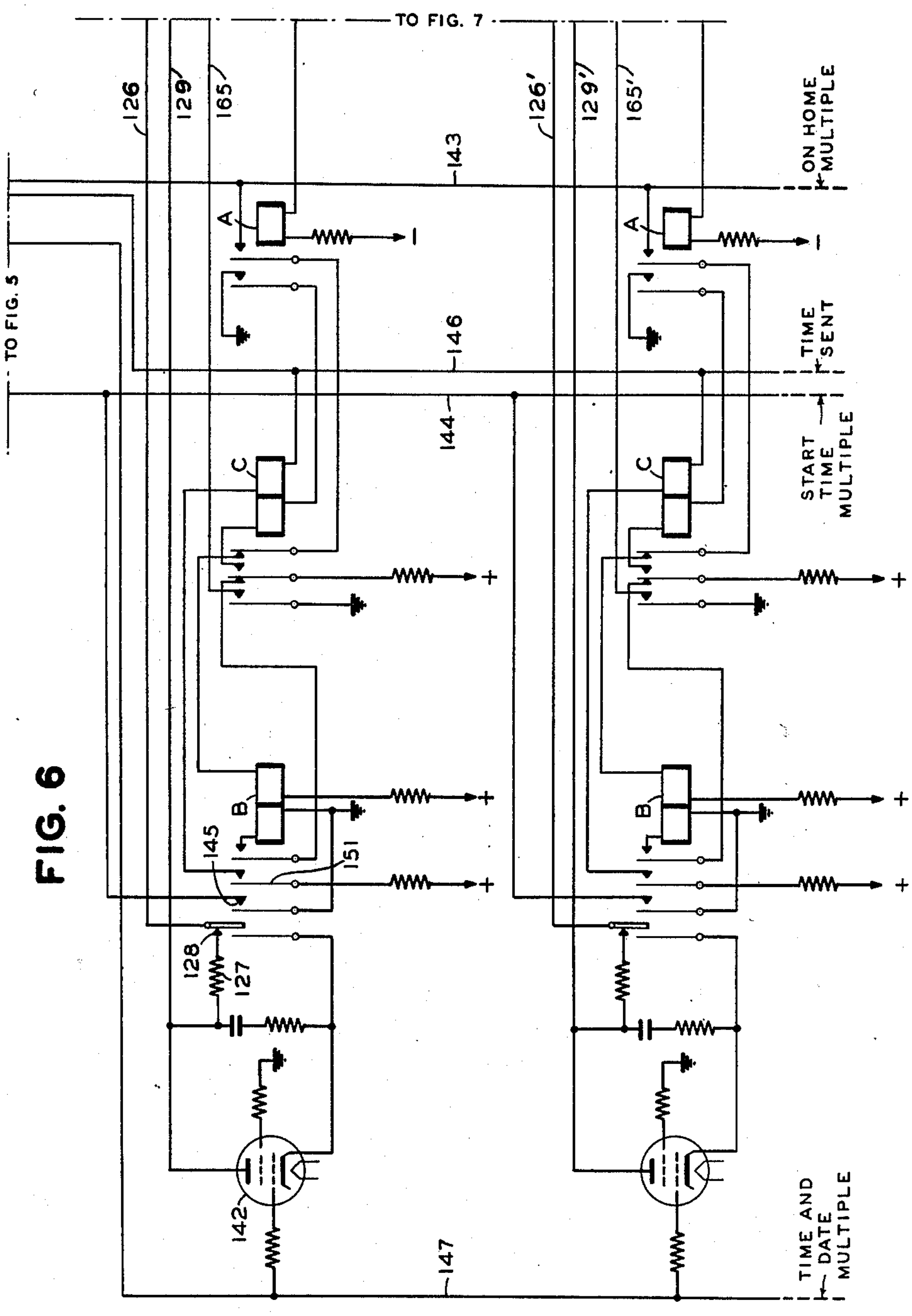
Fig. 6 is a schematic view of the time and date call controlled mechanism.

The solid ring of pair 123 is connected to the transmitting cord circuit, traced over conductor 126, resistance 127 (Fig. 6), make-before-break contact 128 of relay B and conductor 129 to the tip of the plug 131, the sleeve contact of which is grounded. Plug 131 has an auxiliary contact 132 adapted, when the plug is inserted into a line jack, to be grounded. Contact 132 controls the operation of a relay 133 so that when a line is selected for transmission by insertion of the jack 131, relay 133 operates to complete a circuit from battery, through its right armature and back contact and right armature of a relay 134 to the start magnet 125 of distributor 122. The code set up at that time on the contacts of the transmitter is thus transmitted over the line L followed by the remainder of the message until the double period end-of-message signal is reached.

For the purpose of reading this double period end-of-message signal, a group of four relays 135, 136, 137 and 138 is provided. The first of these period signals energizes relays TR1, TR2, TR3 and TR5, relay TR4 being deenergized since this code has only the fourth pulse marking. Thereupon a circuit is closed from battery through the winding of relay 135, the armature and back contact of relay 136, the inner armature and back contact of transmitting relay TR4 and the armature and front contacts of relays TR5, TR3, TR2 and TR1 in series to ground, whereupon relay 135 becomes energized. The period code combination is the only code that will so operate relay 135, the traced circuit being open for all other codes. Relay 135 prepares a locking circuit, including its armature and front contact and the winding of relay 136, that is independent of the contacts of relay 136 and TR4. However, upon the receipt of the next stepping pulse from ring 124, the tongues of the tape transmitter are drawn to the spacing position, preparatory to setting up the next code combination and relay TR4 becomes energized, thus removing a short circuit over conductor 121 around the winding of relay 136 so that this relay operates in series with relay 135 through the contacts of relays TR1, TR2, TR3 and TR5, which remain operated.

At the end of the stepping pulse the second period code in the tape is set up on the relays TR1 to TR5 causing relay TR4 to again deenergize whereupon a circuit is closed from battery through the winding of relay 137, inner armature and back contact of relay 138, armature and front contact of relay 136, and the reading circuit 121 to ground, whereupon relay 137 becomes energized. The energization of relay 137 prepares a circuit through the winding of relay 138 through its inner armature and front contact but relay 138 is short-circuited by the make contacts of relay 138, 136 and the spacing contact of relay TR4 and does not operate until this short circuit is removed. This occurs at the end of the transmission of the second period over line L when the next stepping pulse is applied to the magnet SM to withdraw the tape feelers from the tape, whereupon the tape contacts move to spacing and relay TR4 becomes energized.

Relay 137, it will be recalled, operated when the second period was set up on relays TR1 to TR5, that is, as brush B2 moved off the local stepping pulse segment. Through its outer contact relay 137 energized relay 134 which thereupon at its right armature interrupted the circuit to the start magnet 125 of the transmitting distributor. Brushes B1 and B2 complete their revolution, however, to transmit the second period and to supply another stepping pulse to the tape stepping magnet, this being the pulse which causes operation of relay 138. Brushes B1 and B2 are then brought to rest.

Relay 138 applies ground to operate a time and date message call relay 139, which locks up through its right or locking winding and the back contact of a relay 141. This occurs during the last stepping pulse to magnet SM while it is holding the switch arms 119 of the tape transmitter on their spacing contacts. At the end of this pulse a new character code will be set up on relays TR1 to TR5 other than the period code or a blank, thus interrupting the circuits for relays 135 to 138. Relay 134 holds operated, however, through its left or locking winding and the left make contact of relay 133 until the plug 131 is pulled from its jack.

The time and date message call relay 139 initiates a call to the time and date transmitting apparatus by applying ground to a relay A (Fig. 6) which together with relays B and C and a transmitting vacuum tube 142 are individual to the tape transmitter 118.

Relay A has associated with it an "on home" multiple 143 connected to the inner make contact of the A relays of all transmitters having access to the time and date transmitter. Relays B are similarly associated with a "start time" multiple 144 connected to the make contact 145 of all B relays. Relays C have their right or operating windings connected to a "Time Sent" multiple 146, and the grids of vacuum tubes 142 are connected to a "Time and Date Transmitting" multiple 147.

Relay A upon operating, as described, operates relay B over a circuit from battery through the right or operating winding of relay B, inner armature and back contact of relay C, inner armature and make contact of relay A to multiple 143, thence through the fourth from top contact of disconnect switch 148, conductors 149 and 23, armature 24 and make contact of relay H and armature 25 and back contact of relay J to ground. It will be recalled that relay H was operated only on the idle condition of the time and date transmitter, the circuits for which will be traced subsequently, and relay B, therefore, operates only under this condition. Should the collator switch 6 be off its home position at the time relay A is operated, the operation of relay B awaits its return to such position. Once operated, relay B locks up from battery at the middle armature of relay C, its back contact, inner armature and make contact of relay B and its left or locking winding to ground. Relay B at its make-before-break contacts 128 connects the vacuum tube 142 in series with the cord circuit 126, 129 and removes the resistance 127. At its make contact 145 it connects ground to the "Time Start" multiple 144 and at its armature 151 and make contact it connects battery to the right or operating winding of relay C, and thence to multiple 146, this circuit being open at this time, however, at the armature 25 and make contact of normally released relay J.

The grounding of multiple 144 causes operation of normally released relay F (Fig. 5) from the time and date transmitting distributor TM. This distributor is constantly rotating and upon passage of its local brush LB over local segment Y a circuit is completed for relay F from battery at the local solid ring, brush LB, segment Y, conductor 152, inner armature and back contact of normally released relay J, inner armature and front contact of normally operated relay G, and right winding of relay F to the grounded multiple 144.

Relay F upon operating locks up at its inner armature through armatures 24 and 25 of relays H and J and interrupts at the same armature a locking circuit for relay G traced from battery through inner armature and back contact of relay F to the right or locking winding of relay G. This relay is sufficiently slow to release, however, so that it holds until brush LB passes from the local segment Y. At its outer armature relay F prepares a circuit for the stepping magnet 153 of switch 6 which circuit is completed when the local brush LB engages the next X segment of the local ring. This circuit extends from battery at the local solid ring, brush LB, segment X, conductor 154, sixth level wiper 155 of switch 6, top row sixth level contact 156, conductor 157, outer armature and make contact of relay F, and thence by conductor 158 to the winding of stepping magnet 153 to ground. At the end of the X segment pulse switch 6 steps on to its second row of contacts to set up the figures shift code on the segments of the transmitting ring 159 of the distributor TM.

As brush LB passes from the X to the Y segment, relay H is knocked down by application of positive battery from segment Y, through the inner armature and break contact of relay J, inner armature and break contact of relay G and armature 161 and make contact of relay H to the left or locking winding of this relay, in opposition to the locking ngative battery connected to armature 161. The release of relay H prevents, at open contacts 24, any operation of time setting relay E in response to a minute pulse until after the completion of the time and date transmission. It also prevents operation of any additional B relays by removing ground at contacts 24 from the "On Home" multiple 143. Relay H, also on release, removes a ground at its inner make contact from the "Time and Date Transmission" multiple 147, thus enabling the control grid of tube 142 to be responsive to signals from the transmitter TM, over conductors 162, 163 and "Time and Date" multiple 147.

The distributor shown transmits two characters per revolution. The first character to be transmitted will be the figures shift code, set up as described on its segments, and transmitted over conductors 162, 163 to the grid of all vacuum tubes associated with multiple 147. This character will be transmitted over the cord circuit to line L and over any other cord circuits the B relay of which is operated. The transmitting circuit extends from battery at the rest segment of the transmitter 122 (Fig. 7) over conductor 129, contacts 128 of relay B, vacuum tube 142 and condutcor 126 to the jack 131 and thence to line.

The stepping magnet 153 of switch 6 is operated by each X segment of the local ring of the time and date distributor TM to set up the successive characters on ring 159. When the wipers of switch 6 move on to the last row of contacts to set up the equals sign code on the distributor, a circuit is prepared from the X segment of the local ring over conductor 154, wiper 155 of switch 6, sixth level contact 163, conductor 164, left winding of relay J and conductor 158 to stepping magent 153. Thus, during the transmision of this final character, relay J operates over segment X and at the end of the character, as brush B2 leaves the X segment, switch 6 steps on to its home position and relay J locks over segment Y through its inner armature and make contact, its right winding and the right winding of relay H to ground. Relay H locks through its armature 161 and make contact and at the end of the Y segment pulse relay J releases.

With switch 6 in its home position the next X segment pulse is directed through wiper 155, sixth level contact 156, conductor 157, and outer armature and back contact of relay F to the left winding of relay G. Relay G locks through its right winding and middle armature and the inner armature and back contact of relay F. Thus at the end of the transmission relays H and G are operated and F and J released, which is their normal condition when the time and date transmitter is idle. The time and date transmitter may now be seized by other cord circuits.

At the time relay B operated to seize the time and date transmitter, it will be recalled that a circuit was prepared for relay C from battery through armature 151 and make contact of relay B, and right winding of relay C to multiple 146. During the time the brush LB was last on its Y segment with both relay J and H operated, this circuit was momentarily completed from multiple 146, armature 164 and make contact of relay H and armature 25 and make contact of relay J to ground. Relay C was thus operated and locked from battery on its middle armature and make contact, its left winding and the outer armature and make contact of relay A. Relay C at its inner armature opens the operating circuit for relay B to the multiple 143 and at its middle armature it opens the locking circuit for relay B. Relay B then releases. At its outer armature relay C applies ground to conductor 165 to operate relay 141 (Fig. 7) thus unlocking relay 139 and removing ground from relay A through the middle armature of relay 139. Relay A thus releases unlocking relay C and relays A, B and C are restored to normal with the vacuum tube 142 removed from the cord circuit.

Relay 139 on releasing completes a circuit from battery to its lower armature for a signal 166, the circuit being completed through the lower armature and make contact of relay 167, this latter relay having previously been operated from relay 139 and locked through the lower armature of relay 133. The attendant in response to signal 166 pulls down the plug 131 deenergizing relay 133 and unlocking relays 134 and 167. The cord circuit is now restored to normal and may be switched to any desired line to transmit the next message.

It should be noted that the time and date transmitter will send time and date signals either over a single selected circuit or over a plurality of such circuits simultaneously depending upon the instant of operation of relay A associated with the transmitter, such as 117, connected to an outgoing circuit.

Should several calls for time and date stamp transmission be initiated simultaneously so as to operate a corresponding number of A relays at the same instant, in an idle condition of the time and date transmitter, all calls will be completed simultaneously and time and date signals will be sent over the circuits associated with the calling transmitter, as 117, in the same cycle of operation of the time and date transmitter. Further, any calls received during a cycle of operation of the time and date transmitter will cause operation of the corresponding A relays, but as stated the associated B relays will not operate to complete the calls until the end of the transmitting cycle at which time all accumulated calls will be completed to connect all of the calling circuits to the time and date signal transmitter for its next cycle of operation. Thus the only delay between the initiating of a call for time and date signals and the start of the transmission of such signals over the desired circuit, is that required for the time and date transmitter to complete its current cycle of operation, i. e., up to about five seconds.

It will be obvious that many modifications of the time and date storage and transmitting mechanism may be made and various forms of calling and control circuits provided without departing from the essential attributes of the invention, and all such obvious modifications and variations are contemplated as being within the scope of the appended claims.

What is claimed is:

1. In a telegraph system, a time signal transmitter comprising a transmitting distributor, setting up means operable through a predetermined cycle of applying a plurality of groups of permutation code signals to said distributor in sequential order, said signals being representative of time in hours and minutes, code changing means for periodically modifying the code arrangement of said hour and minute signals in response to periodic minute time signal impulses, means for initiating said setting up means into said cycle of operation to transmit said coded signals by means of said distributor, means to store a minute time signal impulse occurring during said cycle of operation and means for actuating said code changing means in response to said impulse at the completion of said cycle of operation.

2. In a telegraph system, a time signal transmitter comprising a transmitting distributor, setting up means operable through a predetermined cycle for applying a plurality of groups of permutation code signals to said distributor in sequential order, said signals being representative of time in days, hours and minutes, code changing means for periodically modifying the code arrangement of said day, hour and minute signals in response to periodic minute time signal impulses, means for initiating said setting up means into said cycle of operation to transmit said coded signals by means of said distributor and signal means operable by said code changing means upon modification of the coded arrangement of said signals to represent a predetermined day.

3. In a telegraph system, a time signal transmitter comprising a transmitting distributor, setting up means operable through a predetermined cycle for applying a plurality of groups of permutation code signals to said distributor in sequential order, said signals being representative of time in months, days, hours and minutes, code changing means for periodically modifying the code arrangement of said day, hour and minute signals in response to periodic minute time signal impulses, other code changing means for modifying the code arrangement of said month signals, means for initiating said setting up means into said cycle of operation to transmit said coded signals by means of said distributor and signal means operable under joint control of both of said code changing means upon modification of the code arrangement of said signals to represent a predetermined day and month.

4. In a telegraph system, a time signal transmitter comprising a transmitting distributor, setting up means operable through a predetermined cycle for applying a plurality of groups of permutation code signals to said distributor in sequential order, said signals being representative of time in days, hours and minutes, code changing means for periodically modifying the code arrangement of said day, hour and minute signals in response to periodic minute time signal impulses, means independent of said minute signal impulses for modifying the code arrangement of said day signals, and means for initiating said setting up means into said cycle of operation to transmit said coded signals by means of said distributor.

References Cited in the file of this patent

UNITED STATES PATENTS

| Number | Name | Date |
| --- | --- | --- |
| 1,673,369 | Mills | June 12, 1928 |
| 2,200,807 | Potts | May 14, 1940 |
| 2,289,746 | Bacon | July 14, 1942 |
| 2,345,173 | Light | Apr. 11, 1944 |
| 2,357,297 | Wack et al. | Sept. 5, 1944 |
| 2,389,694 | Spencer | Nov. 27, 1945 |
| 2,467,566 | Potts | Apr. 19, 1949 |
| 2,502,654 | Keyes | Apr. 4, 1950 |